United States Patent [19]

Spitz et al.

[11] Patent Number: 4,482,381
[45] Date of Patent: Nov. 13, 1984

[54] SOLID POLYAMINE-BASED FLUID LOSS CONTROL ADDITIVES

[75] Inventors: Rodney D. Spitz; Donald R. Valk, both of Muskegon, Mich.

[73] Assignee: Cordova Chemical Company of Michigan, North Muskegon, Mich.

[21] Appl. No.: 390,598

[22] Filed: Jun. 21, 1982

[51] Int. Cl.$^3$ ............................................. C04B 7/35
[52] U.S. Cl. ....................................... 106/90; 106/314
[58] Field of Search .................... 106/90, 308 N, 314; 166/293

[56] References Cited

U.S. PATENT DOCUMENTS

| | | | |
|---|---|---|---|
| 2,692,871 | 10/1954 | Pechukas | 106/308 N |
| 2,982,665 | 5/1961 | Wilcox | 106/308 N |
| 3,431,231 | 3/1969 | Darcy et al. | 106/308 N |
| 3,455,717 | 7/1969 | Debus | 106/308 N |
| 3,455,718 | 7/1969 | Dithmar et al. | 106/308 N |
| 3,491,049 | 1/1970 | Gibson et al. | 106/90 |
| 4,125,160 | 11/1978 | Crinkelmeyer | 106/90 |

*Primary Examiner*—James Poer
*Attorney, Agent, or Firm*—Cook, Wetzel & Egan, Ltd.

[57] ABSTRACT

A free-flowing solid particulate composition containing a polyamine dispersed on a finely divided, high surface-area silica or silicate adapted to be mixed with dry hydraulic cement to reduce fluid loss during well cementing. Preferably, polyethylenepolyamine or polyethylenimine is dispersed on a high surface-area silica. Improved well cementing in porous media is achieved by mixing the composition with dry hydraulic cement, adding water to the mixture to create a slurry, and pumping the slurry down the well casing into contact with the porous media. The composition acts as a fluid loss control agent at temperatures below 100° F. without sulfonated polymers.

22 Claims, No Drawings

SOLID POLYAMINE-BASED FLUID LOSS CONTROL ADDITIVES

BACKGROUND OF THE INVENTION

Oil well cementing and other underground cementing operations often require placement of a cement slurry in a porous environment such as porous earthen or rock strata.

Problems develop when water filters out of the slurry into the porous media during the setting period. As a result of the rapid water loss, the cement acquires impaired qualities of strength and an uncontrollable setting rate. Also, the water loss from the cement frequently damages the surrounding strata formation. The problem is not cured by producing a cement slurry containing more water. This results in serious placing and setting problems.

Additives have been used to control fluid loss from cement in a porous environment with varying success. For example, U.S. Pat. No. 3,140,269 to Wahl et al. discloses additions of a combination of a copolymer of maleic anhydride and an N-vinyl nitrogen-containing ring monomer, a poly (aryl-vinylbenzyl) compound, and water to Portland or aluminous cement. U.S. Pat. No. 3,662,830 to Martin discloses admixing a salt of lignosulfonic acid and boric acid or a borate with a cement slurry. Other fluid loss additives include carboxymethyl hydroxyethyl cellulose and bentonite. However, these additives are usually accompanied by one or more undesirable effects such as retardation of the setting rate, incompatability of the additive with other cement additives present, precipitation of the cement prior to set, and lessening of the ultimate physical properties of the set cement. Also, economic scarcity and high cost have made many of the additives impractical.

An effective fluid loss control additive exhibiting the most desirable qualities has been the polyamines. Their use is well known. U.S. Pat. No. 3,491,049 to Gibson et al. discloses an aqueous hydraulic cement slurry including hydraulic cement, water, a surfactant, and a small amount of polyalkylenepolyamine, polyalkylenimine or a mixture thereof. McKenzie et al. discuss use of liquid polyamines with lignosulfonate in their article entitled "Polyamine Compounds Control Cement Fluid Loss in Freshwater or Seawater Slurries", Oil & Gas Journal, Mar. 29, 1982, pp. 146-148.

Use of polyamines as an additive has some serious drawbacks however. The polyamines are available only as liquids, usually as 30-50 percent active solutions of the polymers in water. Consequently, they can be added to the hydraulic cement only at the time of formation of the cement slurry. This must be done at the well site immediately prior to pumping the slurry into the well. Under these circumstances, the liquid polyamines must be available at the well and measured for mixing with the cement under non-ideal conditions.

The liquid polyamines also require addition of sulfonated polymers to the cement composition to provide effective fluid loss control. It has been known that sulfonated polymers form a slimy pultaceous precipitate with the polyamines. This is disclosed in U.S. Pat. No. 2,839,417 to Tousignant et al. This precipitate is the effective fluid loss control agent. The sulfonated polymers have the characteristic of acting as retardants. This characteristic is undesirable at temperatures below 100° F.

For the above stated reasons, it is highly desirable to have a solid particulate composition having the superior fluid loss control qualities of the polyamines. This composition could be pre-mixed with dry hydraulic cement obviating the need to add any liquids other than water to create the cement slurry. Also, the amount of additive to be mixed with the hydraulic cement could be measured in a highly controlled area away from the well site. Further, it would be desirable to have a polyamine fluid loss control additive that would be effective at temperatures below 100° F. without sulfonated polymers.

SUMMARY OF THE INVENTION

This invention provides a dry, easily blendable source of polyamine which was heretofore unavailable. The composition is a solid particulate substance which, when added to dry hydraulic cement, reduces fluid loss of the cement in porous media of well bores. Also, the composition is effective as a fluid loss control additive at temperatures below 100° F. without sulfonated polymers.

The composition comprises a polyamine dispersed on a finely divided solid adsorbent.

The polyamine is preferably a polyethylenimine or a polyethylenepolyamine. For purposes of this invention, polyethylenimine is any compound made by either (1) homo- or co-polymerization of substituted or unsubstituted ethylenimines, or (2) polymerization of oxazolines followed by partial or complete hydrolysis. Also, for purposes of this invention, polyethylenepolyamine is any compound made by reaction between a low molecular weight amine and a polyfunctional alkylating agent such as ethylene dichloride or epichlorohydrin.

The polyamine acts to block fluids in the cement from flowing into the adjacent porous strata in a manner similar to the plugging of filter paper in a filter. The molecular weight of the polyamine is crucial to this action. It must be at least 10,000 and is preferably at least 40,000.

An acceptable polyamine for purposes of this invention is polyethylenimine having molecular weight of about 60,000 which is commerically available in a 33 percent aqueous solution as CORCAT ® P-600 from Cordova Chemical Company. Another acceptable polyamine is polyethylenepolyamine having molecular weight of about 40,000 which is commercially available in a 33 percent aqueous solutionn as Purifloc ® C-31 from Dow Chemical Company.

The solid adsorbent can be any silica or silicate having a surface area of at least 1.0 square meter/gram. Silicas such as micronized silica, mined silica, fumed silica, precipitated silica and precipitated spray-dried silica have surface area above 1.0 square meter/gram. Such minimal surface area is required to adsorb sufficient amounts of the polyamine to result in an effective composition. Silica with surface area below 1.0 square meter/gram carry an impractically low quantity of the polyamine and are not contemplated for use in the present invention. Silicas such as micronized silica, mined silica, fumed silica, precipitated silica and precipitated spray-dried silica have surface area above 1.0 square meter/gram and are suitable. The silicates also fall into this category.

Maximum adsorption of polyamine is achieved on adsorbents having high surface area of at least 100 square meters/gram. Silicas such as fumed silica, precipitated silica and precipitated spray-dried silica have a surface area in excess of 100 square meters/gram and are preferred.

The silicas listed above have the added desirable qualities of being compatible in a cement system and, in fact, are commonly used to add compressive stength to cements. More importantly, the composition containing silicas exhibits surprising and unexpected fluid loss control at temperatures below 100° F. without sulfonated polymers. Consequently, because of the retarding effect of the sulfonated polymers, before the present invention no polyamine system could be used for well cementing at temperatures below 100° F.

Such activity of a silica could not be predicted because other similar solid carriers, such as bentonite, absorb polyamine in comparable quantities as silica yet exhibit none of the desired fluid loss control characteristics of the polyamine dispersion on silica.

Various commercial silicas are useful as finely divided solid adsorbents. They include fumed silica commercially available as Cab-O-Sil ® from Cabot Corporation, precipitated silica commercially available as Syloid ® 244 from W. R. Grace Company, precipitated spray-dried silica commercially available as Zeosyl ® 110SD from J. M. Huber Corporation, and mined silica commercially available as Imsil ® A-25 from Illinois Minerals Company.

The preferred composition contains from about 25 to about 65 weight percent polyamine. Compositions containing more than about 65 weight percent polyamine lose the desirable free flowing characteristics necessary for dry blending with dry hydraulic cement. Accordingly, the preferred composition contains from about 35 to about 75 weight percent finely divided solid adsorbent. The composition can also contain about 40 weight percent water as long as the total polyamine and water content together does not exceed about 65 weight percent. The resulting composition is stable when mixed with dry hydraulic cement and the mixture has a long shelf life.

The invention is not limited to inclusion of water on the adsorbent. It is contemplated that other organic solvents can be used in place of water or in mixtures therewith.

The composition can be easily manufactured. The two methods discussed are illustrative and not intended to be a recitation of all possible ways of making the composition of the present invention.

The first method is:
(1) mix 3 parts by weight of 33 percent polyamine solution to 1 part silica or silicate to produce a thick paste;
(2) dry the thick paste at temperatures between 60 and 100 degrees Celcius to produce a dry material; and
(3) grind the dry material to produce a dry, free flowing powder containing about 50 weight percent polyamine.

The resulting weight percent of polyamine in the composition can be modified by changing the amount or concentration of the polyamine solution used in step 1 above.

The second method of manufacture is to spray concentrated polyamine or a solution of polyamine onto silica while the silica is agitated. This method can also use silicate in place of silica. The resulting weight percent of polyamine in the composition will depend upon the concentration of polyamine and the amount of polyamine or solution sprayed on the adsorbent.

The composition can be used with hydraulic cement to cement walls. Such a procedure includes the steps of:
(1) Blending the composition with dry hydraulic cement, preferably Portland cement;
(2) adding water to the mixture to create an aqueous slurry; and
(3) pumping the slurry down the well casing and into contact with porous media during the setting period.

The improvement of this method is the blending of a dry composition consisting of polyamines dispersed on a finely divided silicas or silicates with the dry hydraulic cement prior to formation of the slurry with the addition of water. Preferably, this method utilizes the composition consisting of polyethylenepolyamine or polyethylenimine dispersed on any of the previously mentioned adsorbents. The composition can be blended with dry hydraulic cement at a location far from the well site. This allows the amount of additive to be blended to be measured in a controlled environment. The cement blend containing the additive can then be transported to the well site in a ready-to-use condition. Only water needs to be added at the well site to form a slurry. The slurry containing the fluid loss additive is then pumped down the well casing using available on-line systems for continuous feeding of a dry composition into the well with water. Of course, the invention contemplates addition of other additives to the dry composition or to the slurry as may be desired by the user.

In particular, sulfonated polymers are necessary for effective fluid loss control above 100° F. and must be added either to the dry composition or to the slurry. Lignosulfonate is the sulfonate most frequently used in well cementing and it is expected that the present invention will be used with lignosulfonate for some applications. Calcium chloride is also a commonly used additive.

The amount of composition blended with the dry hydraulic cement will depend upon the concentration of polyamine in the composition, the particular makeup of the media to be cemented, the ambient temperature of the area to be cemented, the particular type of cement, and other factors. However, normally a quantity of composition is added to hydraulic cement to produce a polyamine to cement weight ratio of 0.5:100 to 5.0:100. Preferably, the ratio will be in a range of from 1:100 to 2.5:100.

The amount of water added to the dry blend of composition and cement also depends on many conditions. Preferably, an amount of water is added to create a slurry which, when placed in the geologic formation to be cemented, will set to create a solid cement with maximum strength and bonding characteristics.

The slurry is pumped down the well casing by conventional pumping equipment. A pipe assembly or conveyor system may be employed. Typically, truck mounted mixers provided with high velocity pumps are used. The dry composition has the advantage of being usable in on-line systems for continuously mixing a dry composition with water en route to the site to be cemented. Normally, these systems do not include the ability to add liquid fluid loss control additives.

Examples of compositions which were actually produced in accordance with the present invention are listed in Table 1. The fluid loss control characteristics of some of these compositions are documented in Table 2.

The following examples serve to illustrate the preparation and use of several fluid loss control compositions and their fluid loss characteristics. These examples present comparative data and it will be understood that these examples are set forth for illustrative purposes and many other fluid loss control compositions are within the scope of the present invention.

Class G Portland cement, 1320 grams, and the slid polyamine additive described in Example 9, 39.6 grams, were first dry blended. This blend is mixed with 582 grams water containing 58 grams of calcium chloride. This slurry gave an API fluid loss number of 36 milliliters at 40° F. and an API thickening time of 2.5 hours at 40° F.

TABLE 1

Composition of Solid, Polyamine-Containing Additives

| Example No. | Polyamine Type 1 | Polyamine Mol. Wt. 2 | Solid 3 Carrier | Carrier Surface Area (m²/g) 4 | Polyamine Loading (%) | Water Content (%) | Product Character |
|---|---|---|---|---|---|---|---|
| 1 | PEI | 60,000 | FS | 200 ± 25 | 43 | 5 | Free Flowing Powder |
| 2 | PEI | 60,000 | S | Low | 6 | <2 | Free Flowing Powder |
| 3 | PEI | 60,000 | B | Unknown | 25 | <2 | Free Flowing Powder |
| 4 | PEI | 60,000 | PS | 675 | 25 | <2 | Powder; Some caking |
| 5 | PEI | 60,000 | PS | 310 | 49 | 3 | Free Flowing Powder |
| 6 | PEI | 60,000 | PS | 310 | 56 | <2 | Free Flowing Powder |
| 7 | PEI | 60,000 | PS | 310 | 63 | <2 | Powder; Some caking |
| 8 | PAPA | 40,000 | SDPS | 250 ± 50 | 48 | <2 | Powder; Some caking |
| 9 | PEI | 60,000 | SDPS | 250 ± 50 | 50 | 3 | Free Flowing Powder |
| 10 | PEI | 60,000 | SDPS/MS 5 | 250 ± 50/1.1 | 24 | 5 | Free Flowing Powder |
| 11 | PEI | 60,000 | CAS | Unknown | 34 | 4 | Caking Powder |
| 12 | PEI | 60,000 | SDPS | 250 ± 50 | 35 | 24 | Free Flowing Powder |
| 13 | PEI | 60,000 | SDPS | 250 ± 50 | 38 | 26 | Free Flowing Powder |
| 14 | PEI | 60,000 | SDPS | 250 ± 50 | 39 | 27 | Gel |
| 15 | PEI | 60,000 | SDPS | 250 ± 50 | 32 | 34 | White, granular |
| 16 | PEI | 2,000 | SDPS | 250 ± 50 | 50 | <2 | Free Flowing Powder |

Footnotes to TABLE 1.
1 PEI = Polyethylenimine;
PAPA = Polyalkylenepolyamine
2 Nominal mol. wt. as suggested by manufacturer
3 Key:
FS = fumed silica;
S = mined silica;
B = Bentonite;
PS = precipitated silica;
SDPS = spray dried, precipitated silica;
MS =0 micronized silica;
CAS = synthetic calcium silicate
4 Values as given in manufacturers literature
5 Blend of spray dried, precipitated silica and micronized silica.

TABLE 2

FLUID LOSS RESULTS

| Example No. | Solid Used[1] | Polyamine Level[2] % BWOC | Addition[2] Mode | Lignosulfonate[4] Level, % BWOC | Temperature °F. | Fluid Loss[5] ml. |
|---|---|---|---|---|---|---|
| 17 | a | 1.17 | A | 1.0 | 150 | 42 |
| 18 | 9 | 1.17 | A | 1.0 | 150 | 35 |
| 19 | 9 | 1.17 | A | 1.0 | 206 | 30 |
| 20 | 9 | 1.18 | A | 0.5 | 150 | 34 |
| 21 | 9 | 1.18 | A | 0.25 | 150 | 51 |
| 22 | 13 | 1.15 | A | 1.0 | 150 | 73 |
| 23 | 13 | 1.44 | A | 1.0 | 150 | 37 |
| 24 | 12 | 1.18 | A | 1.0 | 150 | 91 |
| 25 | 12 | 1.33 | A | 1.0 | 150 | 60 |
| 26 | 9 | 1.17 | B | 1.0 | 150 | 135 |
| 27 | 9 | 1.50 | B | 1.0 | 150 | 47 |
| 28 | 13 | 1.47 | B | 1.0 | 150 | 49 |
| 29 | 12 | 1.52 | B | 1.0 | 150 | 60 |
| 30 | 5 | 1.10 | A | 1.0 | 150 | 77 |
| 31 | 16 | 1.17 | A | 1.0 | 150 | 225 |
| 32 | 9 | 1.75 | B | 1.0 | 250 | 76 |
| 33 | 9 | 1.17 | B | 1.0 | 250 | 106 |
| 34 | 8 | 1.16 | A | 1.0 | 150 | 52 |
| 35 | 9 | 1.17 | B | None | 40 | 46 |
| 36 | 9 | 1.50 | B | None | 100 | 135 |
| 37 | 9 | 1.50 | B | None | 115 | 270 |
| 38 | 9 | 1.50 | B | None | 150 | 360 |
| 39 | a | 1.50 | A | None | 80 | 550 |
| 40 | 9 | 1.50 | B | None | 68 | 27 |
| 41 | 3 | 1.00 | A | 1.0 | 150 | 800 |

Footnotes to TABLE #2
[1]The compositions listed in TABLE 1.  a refers to use of aqueous, 33% PEI as a control.
[2]% as active polyamine based on the weight of dry cement
[3]Method A is addition of the additive to the water used to prepare the cement slurry. Method B is dry blending of the additive with the cement.
[4]Based on weight of dry cement.
[5]According to API RP 10B (American Petroleum Institute).

An example of a low temperature application for the composition follows.

What is claimed is:

1. A free flowing solid particulate well cement having reduced fluid loss during well cementing operations comprising:

a composition of a polyamine dispersed on a finely divided, solid adsorbent having surface area of at least 1.0 square meter/gram selected from the group consisting of silica, silicate, and mixtures thereof, wherein about 25 to about 65 percent of the weight of the composition is polyamine; and a dry hydraulic cement blended with the polyamine composition.

2. The well cement of claim 1 wherein the polyamine is a polyalkylenimine.

3. The well cement of claim 2 wherein the polyalkylenimine is polyethylenimine.

4. The well cement of claim 1 wherein the polyamine is a polyalkylenepolyamine.

5. The well cement of claim 4 wherein the polyalkylenepolyamine is polyethylenepolyamine.

6. The well cement of claim 1, 3 or 5 wherein the solid adsorbent is a silica selected from the group consisting of fumed silica, micronized silica, precipitated silica, mined silica, precipitated spray-dried silica and mixtures thereof.

7. The well cement of claim 1, 3 or 5 wherein the solid adsorbent is a silica having high surface-area of at least 100 square meters/gram selected from the group consisting of fumed silica, precipitated silica, precipitated spray-dried silica and mixtures thereof.

8. The well cement of claim 7 wherein the composition consists of from 25 to about 65 percent polyamine, from about 35% to 75% solid adsorbent and up to about 40% water.

9. In the method of well cementing, employing an aqueous slurry made from a dry hydraulic cement, fluid loss control additive and water, wherein the slurry is brought into contact with a porous medium prior to and during the setting period, the improvement which comprises admixing with said cement said fluid loss control additive comprising a free flowing dry composition comprising a polyamine dispersed on a finely divided, high surface area solid adsorbent from the group consisting of silica, silicate and mixtures thereof prior to the addition of water.

10. The method of claim 9 for well cementing at high temperatures wherein the slurry also contains a sulfonated polymer.

11. The method of claim 9 for well cementing at low temperatures wherein the slurry containing the polyamine dispersed on an adsorbent is essentially free of sulfonated polymers.

12. The method of claim 11 wherein the slurry further contains calcium chloride.

13. The method of claim 9 wherein the polyamine is polyalkylenimine.

14. The method of claim 13 wherein the polyalkylenimine is polyethylenimine.

15. The method of claim 9 wherein the polyamine is polyalkylenepolyamine.

16. The method of claim 15 wherein the polyalkylenepolyamine is polyethylenepolyamine.

17. The method of claim 9, 14 or 16 wherein the solid adsorbent is a silica from the group consisting of fumed silica, micronized silica, precipitated silica, mined silica, precipitated spray-dried silica and mixtures thereof.

18. The method of claim 9, 14 or 16 wherein the solid adsorbent is a high surface area silica from the group consisting of fumed silica, precipitated silica, precipitated spray-dried silica and mixtures thereof.

19. The method of claim 17 wherein the composition consists of from 25% to about 65% polyamine, from about 35% to 75% solid adsorbent, and up to about 40% water.

20. The method of claim 9 wherein a quantity of the composition is added to the dry hydraulic cement to produce a polyamine to cement weight ratio of from about 0.5:100 to about 5.0:100.

21. The well cement of claim 1 wherein the weight ratio of polyamine in the polyamine composition to dry hydraulic cement is in the range of from 0.5:100 to 5.0:100.

22. The well cement of claim 1 wherein the weight ratio of polyamine in the polyamine composition to dry hydraulic cement is in the range of from 1:100 to 2.5:100.

* * * * *